(12) United States Patent
Morrell (10) Patent No.: US 11,319,053 B2
(45) Date of Patent: May 3, 2022

(54) SECONDARY LOCKING MECHANISM (71) Applicant: AIRBUS OPERATIONS LIMITED, Bristol (GB)

(72) Inventor: Paul Morrell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 383 days.

(21) Appl. No.: 16/389,058

(22) Filed: Apr. 19, 2019

(65) Prior Publication Data
US 2019/0322350 A1 Oct. 24, 2019

(30) Foreign Application Priority Data

Apr. 24, 2018 (GB) ...................................... 1806660

(51) Int. Cl.
*B64C 3/56* (2006.01)
(52) U.S. Cl.
CPC ...................................... *B64C 3/56* (2013.01)
(58) Field of Classification Search
CPC ... B64C 23/072; B64C 3/56; B64C 3/42; B64C 3/38; B64C 5/10; B64C 23/069; Y02T 50/10
See application file for complete search history.

(56) References Cited

U.S. PATENT DOCUMENTS

| | | | | |
|---|---|---|---|---|
| 2,280,809 A | * | 4/1942 | Evans | B64C 3/56 116/285 |
| 2,320,849 A | * | 6/1943 | Keck | H01H 9/20 70/265 |
| 2,683,574 A | * | 7/1954 | Peterson | B64C 3/40 244/46 |
| 5,201,479 A | * | 4/1993 | Renzelmann | B64C 3/56 244/49 |

(Continued)

FOREIGN PATENT DOCUMENTS

| EP | 3 246 245 | 11/2017 |
|---|---|---|
| EP | 3 254 958 | 12/2017 |

OTHER PUBLICATIONS

Combined Search and Examination Report for GB 1806660.5, dated Oct. 16, 2018, 5 pages.

(Continued)

*Primary Examiner* — Medhat Badawi
(74) *Attorney, Agent, or Firm* — Nixon & Vanderhye P.C.

(57) ABSTRACT

An aircraft having a fixed wing and a wing tip device at the tip thereof is disclosed. The wing tip device is configurable between: (i) a flight configuration for use during flight and (ii) a ground configuration for use during ground-based operations, in which ground configuration the wing tip device is moved away from the flight configuration such that the span of the aircraft wing is reduced. A locking mechanism locks the wing tip device in the flight configuration, and includes a plurality of lugs located on each of the fixed (Continued)

wing and wing tip device. Locking pins are inserted through and lock together corresponding lugs when the wing tip device is in the flight configuration. A secondary locking mechanism of a plurality of blocking members prevents the removal of the locking pins from the corresponding lugs, whereby the plurality of blocking members have a common actuator.

10 Claims, 8 Drawing Sheets

(56) References Cited

U.S. PATENT DOCUMENTS

| | | | | |
|---|---|---|---|---|
| 5,350,135 | A * | 9/1994 | Renzelmann | B64C 3/56 244/49 |
| 5,379,969 | A * | 1/1995 | Marx | B64C 3/56 244/49 |
| 5,381,986 | A * | 1/1995 | Smith | B64C 3/56 244/49 |
| 5,427,329 | A | 6/1995 | Renzelmann et al. | |
| 5,558,299 | A * | 9/1996 | Veile | B64C 3/56 244/49 |
| 5,988,563 | A * | 11/1999 | Allen | B64C 3/56 244/49 |
| 6,076,766 | A * | 6/2000 | Gruensfelder | B64C 3/56 244/130 |
| 6,260,799 | B1 * | 7/2001 | Russ | B64C 3/56 244/49 |
| 7,275,722 | B2 * | 10/2007 | Irving | B64C 23/072 244/201 |
| 7,600,297 | B2 * | 10/2009 | Gitnes | B64C 3/56 16/331 |
| 7,744,038 | B2 * | 6/2010 | Sankrithi | B64C 23/076 244/199.4 |
| 8,210,473 | B2 * | 7/2012 | Schweighart | B64C 3/56 244/49 |
| 9,139,285 | B2 * | 9/2015 | Schlipf | B64C 3/56 |
| 9,211,946 | B2 * | 12/2015 | Good | B64C 3/56 |
| 9,290,260 | B2 * | 3/2016 | Lassen | B64C 3/56 |
| 9,296,471 | B2 * | 3/2016 | Sakurai | B64C 3/40 |
| 9,415,857 | B2 * | 8/2016 | Fox | B64C 3/56 |
| 9,469,392 | B2 * | 10/2016 | Fox | B64C 23/072 |
| 9,481,446 | B2 * | 11/2016 | Lassen | B64C 3/56 |
| 9,499,252 | B2 * | 11/2016 | Lassen | B64C 3/56 |
| 9,889,920 | B2 * | 2/2018 | Harding | B64C 23/072 |
| 9,908,612 | B2 * | 3/2018 | Fox | B64C 3/56 |
| 9,914,523 | B2 * | 3/2018 | Good | B64C 3/56 |
| 9,919,809 | B2 * | 3/2018 | Moy | G07C 5/0808 |
| 10,106,244 | B2 * | 10/2018 | Good | B64C 13/42 |
| 10,137,977 | B2 * | 11/2018 | Thompson | B64C 23/072 |
| 10,137,978 | B2 * | 11/2018 | Harding | B64C 3/56 |
| 10,479,479 | B2 * | 11/2019 | Hancock | B64C 23/072 |
| 10,501,167 | B2 * | 12/2019 | Kracke | B64C 3/56 |
| 10,597,138 | B2 * | 3/2020 | Bishop | F16C 11/10 |
| 10,597,140 | B2 * | 3/2020 | Thompson | B64C 3/56 |
| 10,676,175 | B2 * | 6/2020 | Moore | B64C 23/069 |
| 10,808,808 | B2 * | 10/2020 | Crine | F16H 19/02 |
| 10,974,810 | B2 * | 4/2021 | Good | B64C 9/24 |
| 2011/0042525 | A1 * | 2/2011 | Parker | B64C 9/16 244/213 |
| 2012/0032023 | A1 * | 2/2012 | Bousfield | B64C 3/56 244/49 |
| 2013/0099060 | A1 * | 4/2013 | Dees | B64C 3/56 244/199.4 |
| 2016/0332722 | A1 * | 11/2016 | Harding | B64C 3/56 |
| 2017/0152017 | A1 | 6/2017 | Good et al. | |

OTHER PUBLICATIONS

Extended European Search Report for European Application No. 19165462.3, six pages, dated Aug. 12, 2019.

* cited by examiner

SECONDARY LOCKING MECHANISM

CROSS RELATED APPLICATION

This application claims priority to United Kingdom (GB) patent application 1806660.5, filed Apr. 24, 2018, the entire contents of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the folding wing tip device in the flight configuration, one or more locking mechanisms must be used. However, conventional locking mechanisms may not provide the secure fastening required for a folding wing tip.

The present invention seeks to mitigate the above-mentioned problems. Alternatively or additionally, the present invention seeks to provide an improved wing tip device and locking mechanism.

SUMMARY OF THE INVENTION

The present invention provides an aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising a locking assembly for locking the wing tip device in the flight configuration, the locking assembly comprising a plurality of lugs located on each of the fixed wing and wing tip device, and locking pins which are inserted through and lock together corresponding lugs when the wing tip device is in the flight configuration, and further comprising a secondary locking mechanism of a plurality of blocking members which prevent the removal of the locking pins from the corresponding lugs. The plurality of blocking members have a common actuator.

Advantageously, a secure locking system is provided, with a single blocking device being capable of blocking, or secondary locking, a plurality of primary locking arrangements. The blocking members may be configured to allow greater or lesser amounts of free play in the locking pins. The actuation of the secondary locking mechanism, and more preferably of the blocking members, may be independent of the actuation of the locking pins. The locking pins may be located such that when the locking pins are in the unlocked position, they obstruct movement of the blocking members into the blocking position. Such an arrangement will prevent a "false locking" where the locking pins are in the unlocked position and the blocking members are moved into the blocking position.

The plurality of blocking members may be mounted on a common drive axle, and movement of the blocking members into and out of the locking position may be by rotation of the drive axle.

The plurality of blocking members may be mounted on a common drive bar, wherein the drive bar forms part of a linkage, and movement of the blocking members into and out of the locking position may be by actuation of the linkage. The locking pins may extend from a locking bar and the blocking members may be configured to abut the locking bar in order to prevent removal of the locking pins.

In embodiments of the invention, the blocking members prevent the removal of the locking pins from the corresponding lugs. In principle, there may be a variety of different ways of achieving the blocking of the removal of the pins. For example, the blocking members may be configured to abut the locking pins in order to prevent removal of the locking pins. In some embodiments, the blocking members may be configured to abut axial ends of the respective locking pins. In some embodiments, the blocking members may extend into a recess or opening within the respective locking pin (for example in a direction normal to the axis of the respective locking pin).

At least one blocking member may comprise a flared top section. The secondary locking mechanism may be configured such that when said blocking member is blocking movement of a locking pin in a first direction, the flared top section is also blocking movement in a direction perpendicular thereto. The flared top section may comprise a flange extending towards the top of the blocking member, such that the flange provides a deadlocking effect when the blocking member is in the blocking position. The deadlocking effect may mean the blocking member may not be moved from the blocking position without deliberate actuation of the blocking members (for example because it blocks movement in two directions (for example the first direction and a direction perpendicular to the first direction, as shown by arrow "P").

According to a second aspect, there is provided an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising a locking assembly for locking the wing tip device in the flight configuration, the locking assembly comprising a plurality of lugs located on each of the fixed wing and wing tip device, and locking pins which are inserted through and lock together corresponding lugs when the wing tip device is in the flight configuration, and further comprising a secondary locking mechanism of a plurality of blocking members which prevent the removal of the locking pins from the corresponding lugs, whereby the plurality of blocking members have a common actuator.

According to a third aspect, there is provided a method of locking a wing tip device on an aircraft described according to any aspect herein. The method may comprise the steps of: positioning the wing tip device in the flight configuration, actuating the locking pins such that they are inserted through and lock together corresponding lugs, and actuating the blocking members such that they obstruct the movement of the locking pins out of the lugs. The actuation of the blocking members may be a common actuation by a single actuator.

According to a fourth aspect, there is provided a method of unlocking a wing tip device on an aircraft described according to any aspect herein. The method may comprise the steps of: actuating the blocking members such that they do not obstruct the movement of the locking pins out of the lugs, and actuating the locking pins such that they are withdrawn from the corresponding lugs, thereby allowing unrestricted movement of the lugs. The actuation of the blocking members may be a common actuation by a single actuator.

According to yet another aspect, there is provided a secondary locking mechanism for use as the secondary locking mechanism described herein. The secondary locking mechanism may comprise a plurality of blocking members for preventing the removal of locking pins from corresponding lugs. The plurality of blocking members are preferably configured for actuation by a common actuator.

According to yet another aspect, there is provided a locking assembly for an aircraft wing having a foldable wing tip that is hinged between (i) a flight configuration for use during flight and (ii) a ground configuration for use during ground-based operations, in which ground configuration the wing tip at the tip of a fixed wing is moved away from the flight configuration such that the span of the aircraft wing is reduced, wherein the locking assembly is for locking the foldable tip in the flight configuration, and comprises: a primary locking arrangement comprising a series of locking pins for insertion through aligned apertures between interleaving lugs on the tip of the fixed wing and root of the wing tip, and a secondary locking arrangement comprising a plurality of blocking members which are able to be actuated into a blocking position by a common actuator, to block the removal of the locking pins from the aligned apertures. There may also be provided an aircraft wing, and an aircraft comprising such a locking assembly.

It will be appreciated that in all aspects of the invention, both the locking pins and the secondary locking assembly perform a lock function (i.e. they prevent relative movement between two parts). Nevertheless, in some scenarios the locking pins may instead be referred to as 'latch pins', and the secondary locking mechanism may be referred to as a lock, or a latch lock. In light of this, it will be understood that the locking pins of aspects of the present invention may therefore also be synonymous with latch pins in some situations.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device is preferably moveable between the flight and ground configurations under a rotation. The rotation is preferably about a hinge axis. The hinge axis may pass through a series of interleaving hinge lugs on the fixed wing and the wing tip device.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device, and/or where there is a fairing at the junction. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1A:
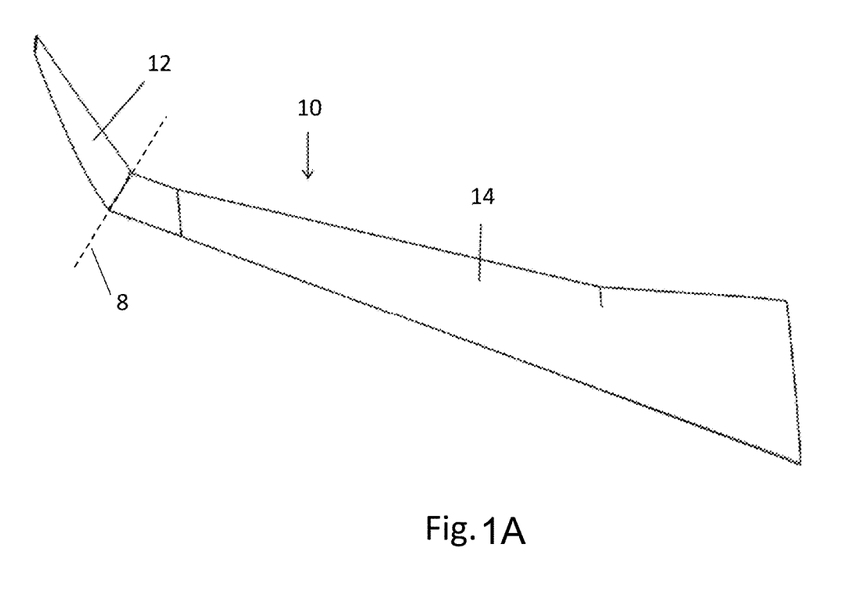
FIG. 1A shows a schematic view of an aircraft wing according to a first embodiment of the invention, with the wing tip device in the ground configuration.
Figure 1B:
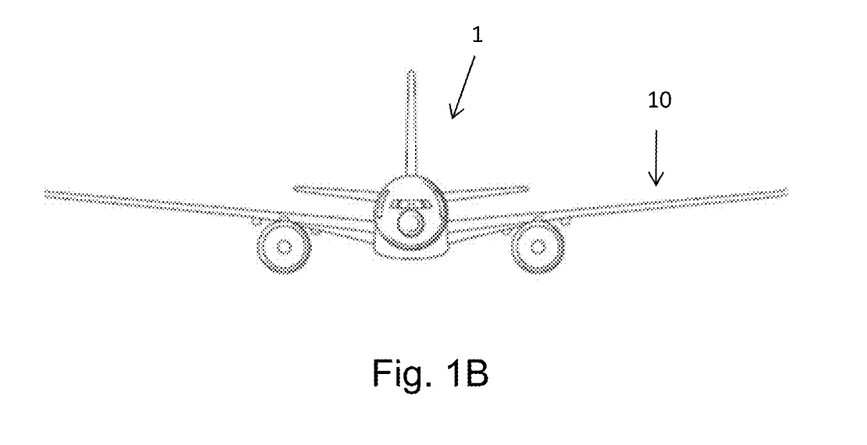
FIG. 1B shows a schematic view of an aircraft comprising the wing of FIG. 1A but with the tip in the flight configuration.

FIG. 1A schematically shows a wing 10 comprising a wing tip device 12 and a fixed wing 14. FIG. 1B shows an aircraft 1 comprising the wing 10. The wing tip device 12 is configurable between: (i) a flight configuration for use during flight (as shown in FIG. 1B) and (ii) a ground configuration for use during ground-based operations (as shown in FIG. 1A). In the ground configuration the wing tip device 12 is moved away from the flight configuration such that the span of the aircraft wing 10 is reduced below an airport gate limit. To move from the flight configuration to the ground configuration, the wing tip device 12 is rotated about a hinge axis 8.

In this embodiment of the invention the wing tip device 12 is a planar wing extension (and thus may be considered moveable wing tip as such). In other embodiments, the wing tip device may be, or comprise, a non-planar device such as a winglet.

Figure 1C:
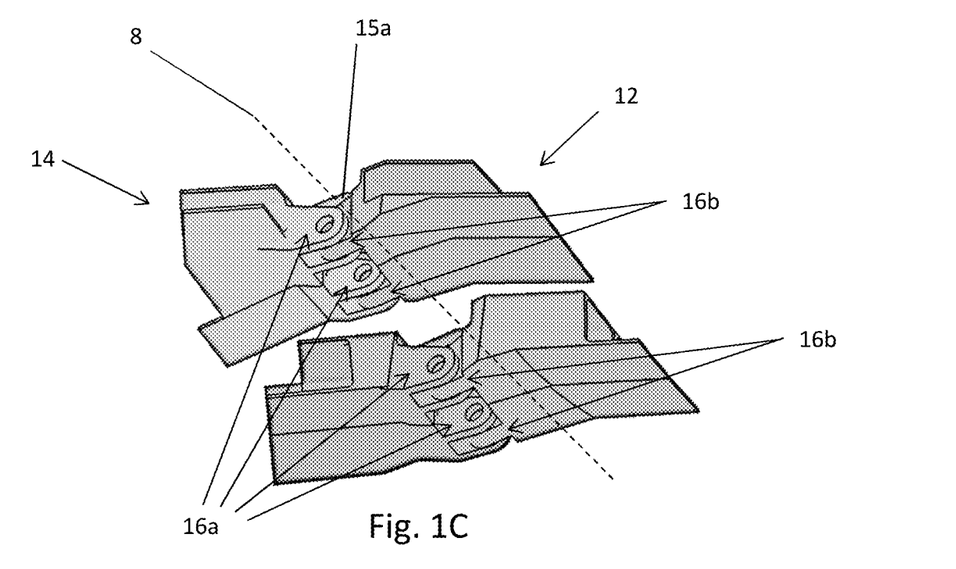
FIGS. 1C and 1D show the hinge and latching lugs at the junction between the fixed wing and wing tip device, for both the flight and ground configurations respectively.
Figure 1D:
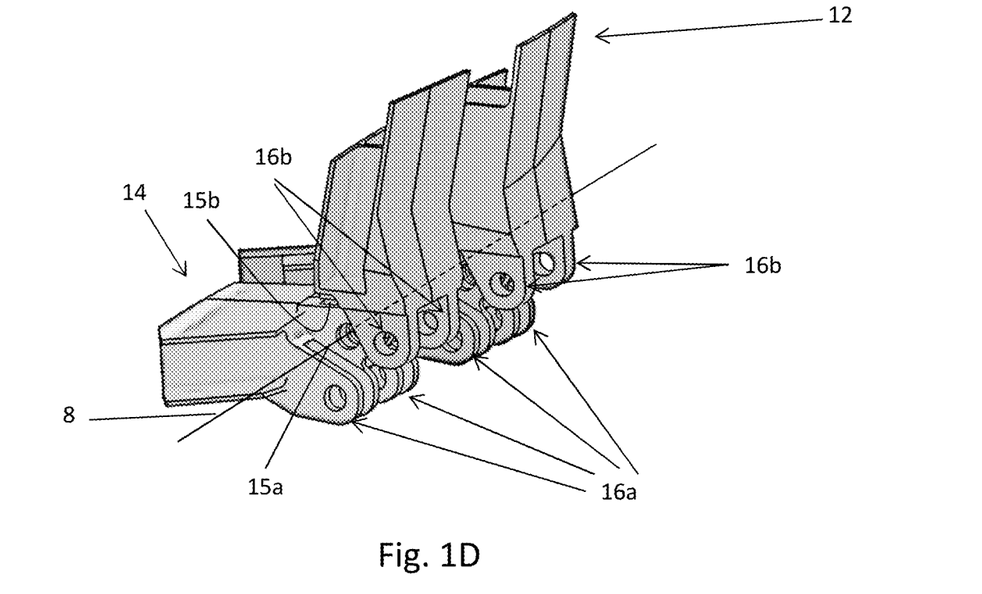

FIGS. 1C and 1D show part of the structure at the junction between the fixed wing 14 and wing tip device 12, in both the flight and ground configurations respectively. For clarity, only the hinge lugs and the latching lugs are shown; other structure surrounding the lugs has not been shown. FIG. 1C shows the arrangement from slightly below the wing, whereas FIG. 1D shows the arrangement from slightly above.

Referring now to FIGS. 1C and 1D in more detail, the tip of the fixed wing 14 comprises a series of hinge lugs 15a and latching lugs 16a (shown on the left-hand side of FIGS. 1C and 1D). The root of the wing tip device 12 also comprises a corresponding series of hinge lugs 15b and latching lugs 16b (shown on the right-hand side of FIGS. 1C and 1D). The respective sets of lugs are offset laterally, such that when the fixed wing 14 and wing tip device 12 are connected, the lugs interleave one another, and their respective apertures are aligned.

The hinge axis 8 is coaxial with a hinge pin (not shown) extending through the aligned hinge-axis holes in the interleaving hinge lugs 15a and 15b. The hinge lugs 15a/15b are upper-most at the junction. They are shaped such that the hinge-axis holes are located above the mid-thickness of the wing, and above the latching lugs 16a, 16b (lower-most at the junction and described in further details below). The wing tip device can rotate about the hinge axis 8 from the flight configuration (see FIG. 1C) to the ground configuration (see FIG. 1D). A hinge lug/hinge pin arrangement of this nature is known per se and is not described in any further detail herein. Instead, embodiments of the invention tend to relate to a primary and secondary locking mechanism, as will now be described with reference to the latching lugs 16a/16b.

Figure 2:
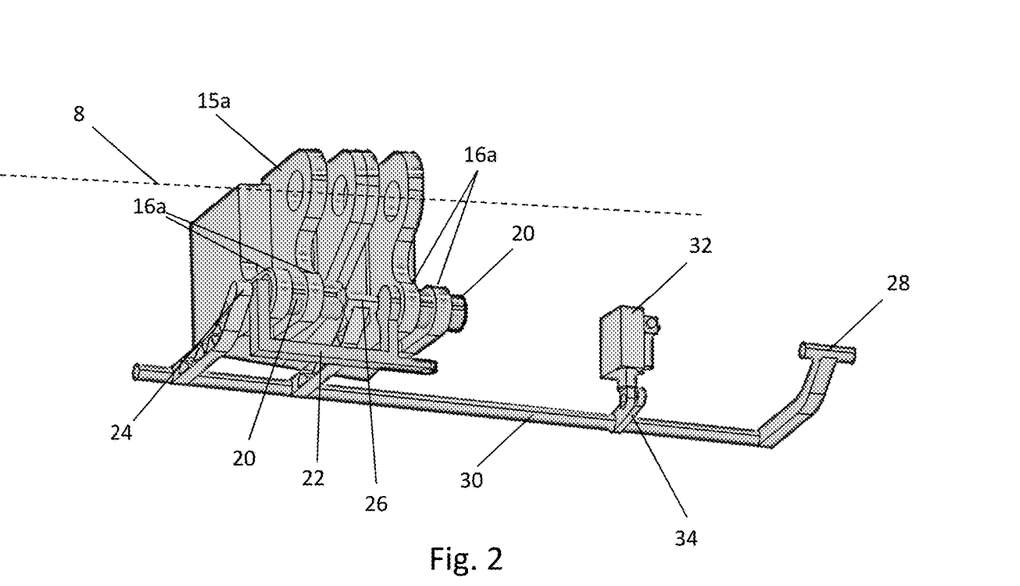
FIGS. 2 to 6 show a locking arrangement used on the wing of FIG. 1A to 1C.

In the first embodiment of the invention, the latching lugs 16a, 16b are located along the lower-most part of the junction structure. The latching lugs 16a/16b of the fixed wing 12 and wing tip device 14 interleave one another in the flight configuration (see FIG. 1C), to create a series of aligned holes. Locking pins are able to be inserted through those holes to lock the wing tip device 12 into the flight configuration. When the locking pins are retracted from the aligned holes, the wing tip device is free to rotate upwards about the hinge axis 8—this is described in more detail with reference to FIGS. 2 to 6:

FIG. 2 shows a primary locking mechanism, in the first embodiment of the invention, which may be used to lock the wing tip device 12 in the flight configuration, and unlock the wing tip device 12 in order to enable the wing tip device 12 to be moved to the ground configuration. For the sake of clarity, a short section of the latching lugs 16a (and hinge lugs 15a) of only the fixed wing 14 are shown in FIG. 2. It will be appreciated that in the flight configuration, corresponding lugs 16b/15b on the wing tip device interleave the lugs on the fixed wing (in the manner shown in FIGS. 1C and 1D). However, these are omitted from view in FIGS. 2 to 6 to enable a better understanding the operation of the locking arrangement.

The set of latching lugs 16a in FIG. 2 form part of the locking arrangement on the fixed wing 14. When the latching lugs 16a of the fixed wing are interleaved with the latching lugs 16b of the wing tip device, the apertures are aligned. A primary locking mechanism comprises a plurality of locking pins 20 (which may also be referring to as latching pins), which may be inserted through the apertures in the latching lugs 16a/16b to prevent the lugs moving apart from each other, thereby locking the wing tip device in the flight configuration.

In the illustration of FIG. 2, there are two locking pins 20 arranged in series, on a common drive bar 22. The locking pins 20 may be moved into the locking position by movement of the common drive bar 22 in one direction, and moved out of the locking position (i.e. withdrawn from the apertures) by movement of the common drive bar 22 in the opposite direction (i.e. in a direction along the longitudinal axis of the locking pins 20).

Figure 3:
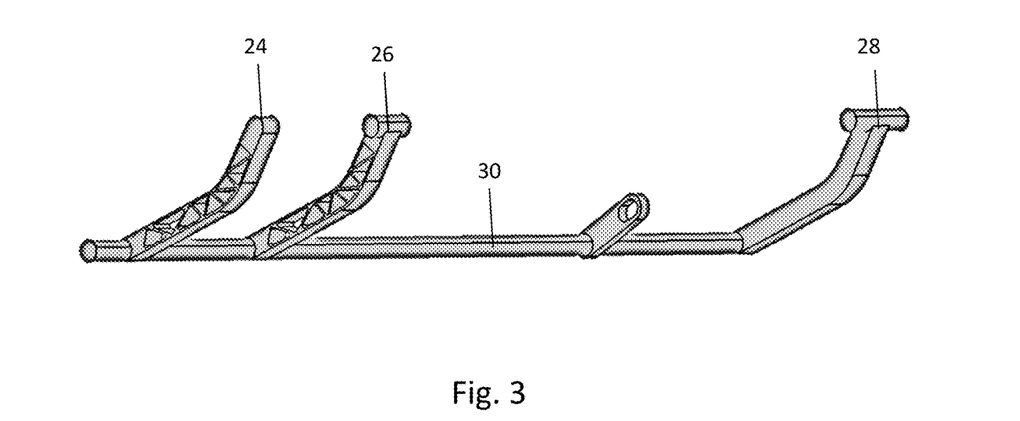

In the first embodiment of the invention, the locking assembly also comprises a secondary locking mechanism. The secondary locking mechanism comprises a plurality of blocking members 24, 26 and 28, connected to a common drive axle 30. When the wing tip device is in the flight configuration (as shown in FIG. 2), the blocking members 24 and 26 physically block movement of the locking pins 20 out of the apertures in the latching lugs 16a/16b. FIGS. 2 and 3 show the blocking member 28 in isolation for the sake of clarity. It will be appreciated that the blocking member 28 would in reality be adjacent to at least one of the other lug and locking pin combinations, which are not visible in FIGS. 2 and 3.

The drive axle 30 of the secondary locking mechanism is arranged to be driven by an actuator 32 driving a cam 34, such that linear movement of the actuator 32 is converted into a rotation of the drive axle 30. The blocking members 24, 26, 28 may be rotated into and out of the blocking position by activation of this common actuator 32 (illustrated further with reference to FIGS. 5 and 6).

Once the locking pins 20 have been slid across into the lugs (via movement of the common drive bar 22), the actuator 32 drives the drive axle 30 to move the blocking members 24, 26, 28, in to a position proximate to the locking pins 20, such that the locking pins 20 cannot be removed from the lugs 16a, 16b, by virtue of being obstructed by the blocking members 24, 26, 28.

Prior to movement of the locking pins 20 into the latching lugs, the rotation of the blocking members 24, 26, 28 into the blocking position will be obstructed by the locking pins 20. However, after translational movement of the locking pins 20 into the apertures of the latching lugs 16a/16b, space is created for the blocking members 24, 26, to be blocked. Therefore, the possibility of a false locking, where the blocking members are located in the blocking position but the locking pins are not in the locking position, is eliminated.

Figure 4:
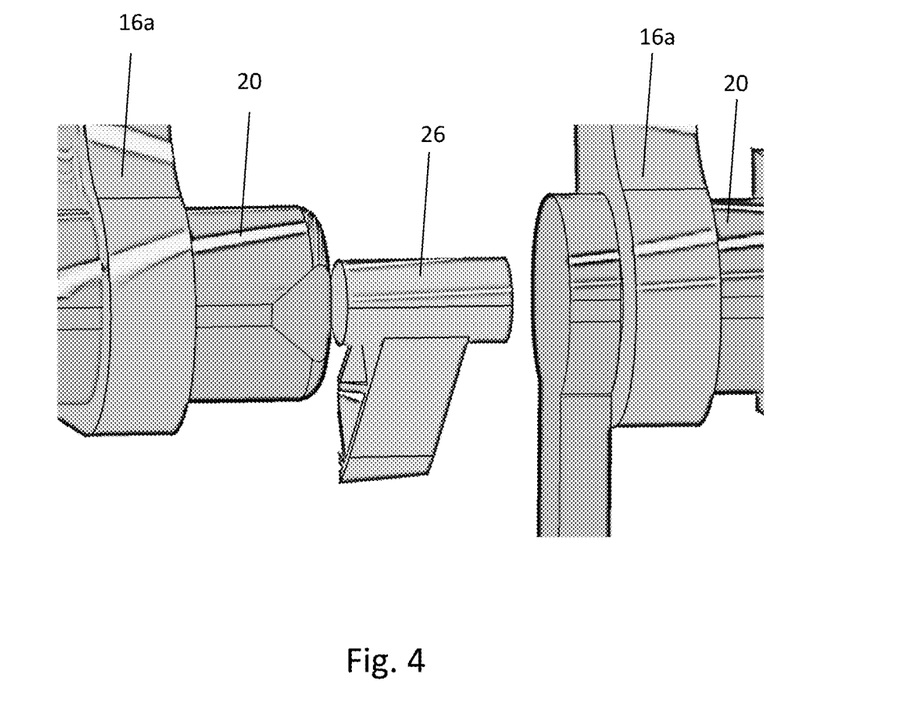

FIG. 4 is a close-up view showing the interaction between one of the blocking members 26 and the locking pins 20. Referring now to FIG. 4, the blocking member 26 may be sized to allow a certain limited amount of play in the locking pins 20 when the pins are in the locked position. Allowing a certain amount of play, whilst still preventing unintentional unlocking of the locking pins 20 may provide a greater manufacturing tolerance when building the locking system. Alternatively, the blocking members may be sized to allow substantially no play in the locking pins 20 when in the locked position. Such an arrangement may provide an even more secure locking system, and/or reduce wear in the system due to play in the locking pins and/or blocking members.

Figure 5:
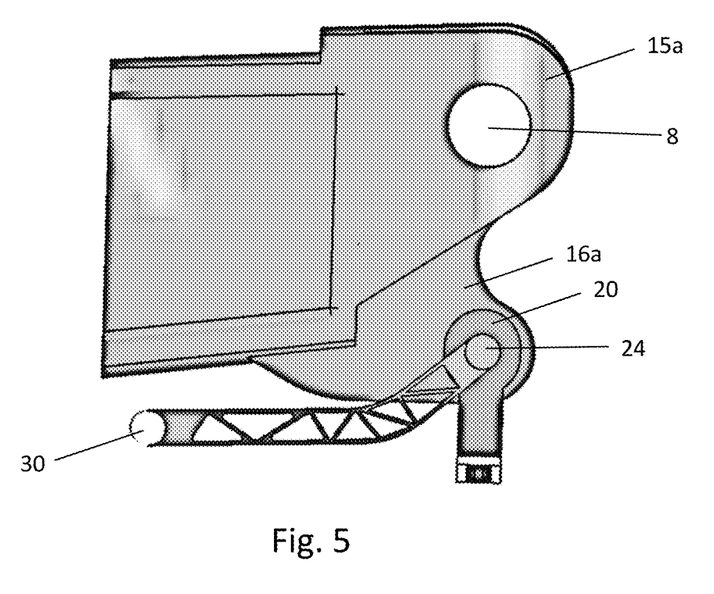
Figure 6:
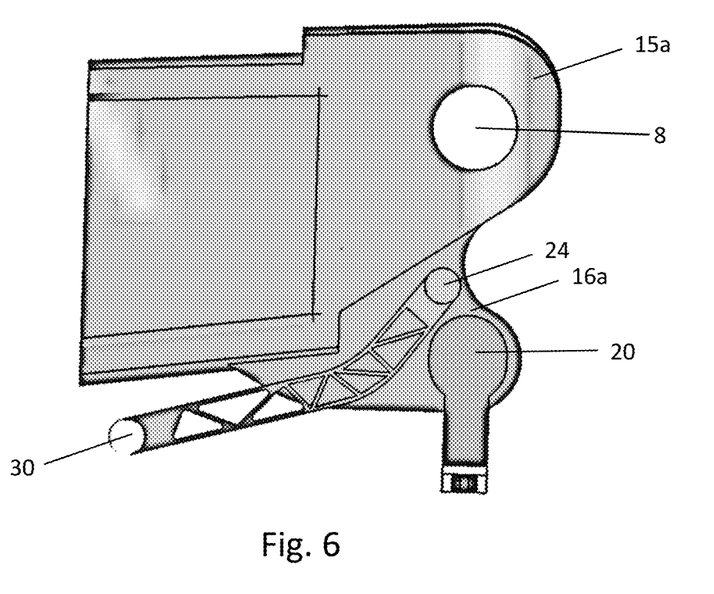

FIG. 5 is a view in a direction along the hinge axis, showing the blocking member 24 in the blocking position, where the locking pin 20 has been actuated into the locked position. FIG. 6 shows the blocking member 24 rotated away from the blocking position, such that the locking pin 20 can be withdrawn from the latching lugs 16a/16b. As can be clearly seen, the secondary locking mechanism is rotated up (by the common actuator 32) towards the fixed wing. This removes the blocking member 24 (and adjacent member 26—not visible in FIGS. 5 and 6) from the path of the locking pins 20 and allows them to be removed, thereby enabling the wing tip device to be moved to the ground configuration via a rotation about the hinge 8.

FIGS. 7 to 11 shows an example of an alternative embodiment. For the sake of clarity, the latching lugs 72a, 78a of only the fixed wing are shown in FIG. 7-11. It will be appreciated that in the flight configuration, corresponding lugs 72b on the wing tip device interleave the lugs on the fixed wing (broadly in the manner shown in FIGS. 1C and 1D). However, these are omitted from view to enable a better understanding of the operation of the locking arrangement.

Figure 7:
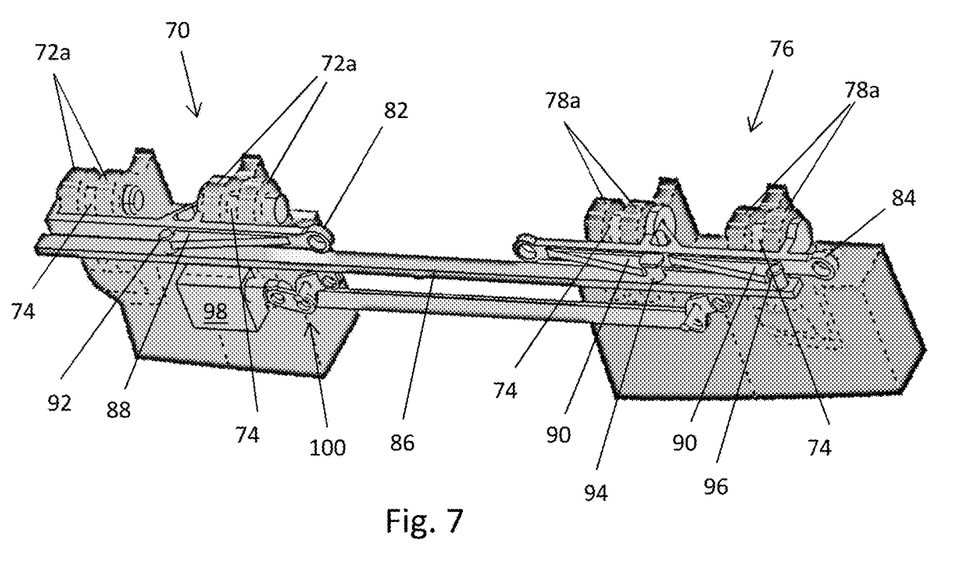
FIGS. 7 to 11 show a locking arrangement according to a second embodiment of the invention.
Figure 8:
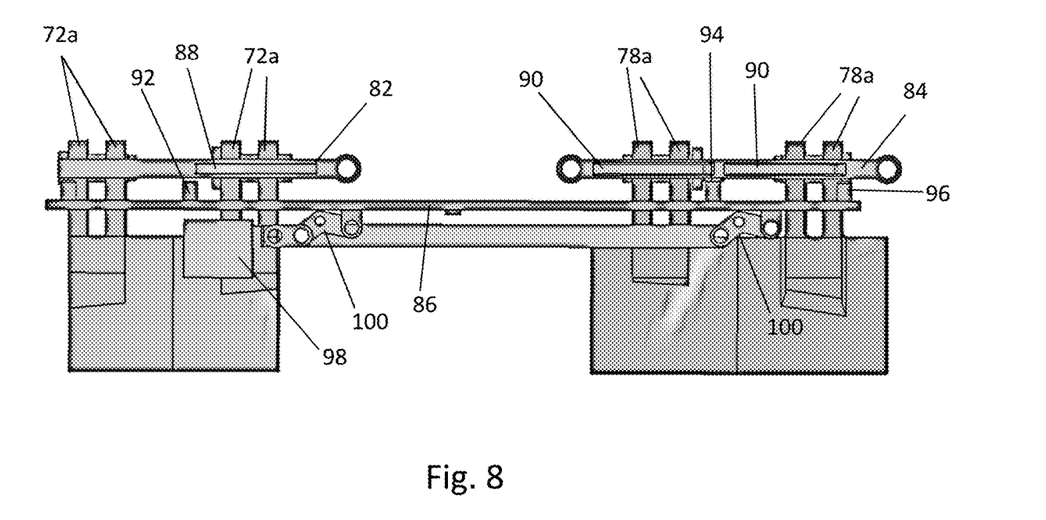
Figure 9:
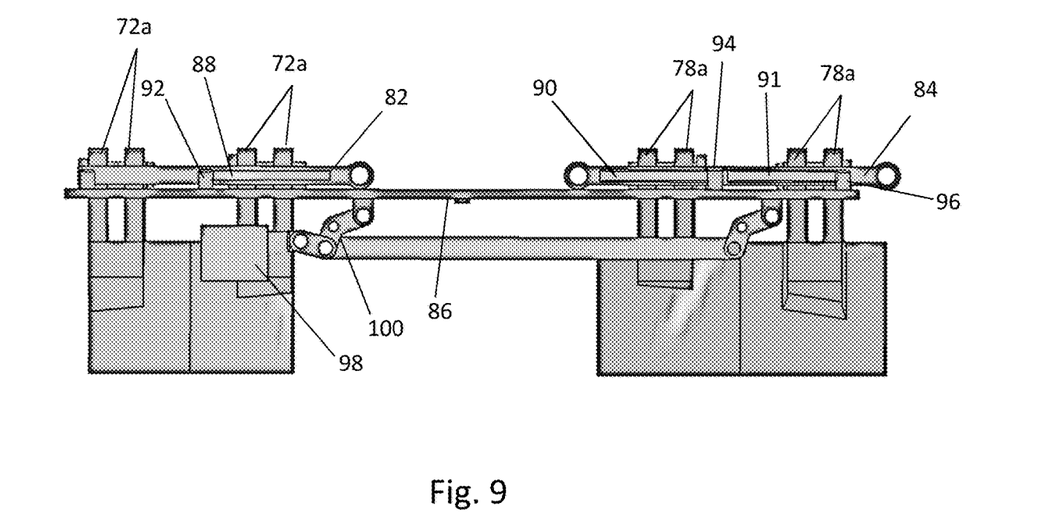

Referring initially to FIGS. 7 to 9, a first section of latching lugs 70, located towards the leading edge of the tip of the fixed wing, comprises two sets of latching lugs 72a. A second section of latching lugs 76, located towards the trailing edge of the fixed wing, also comprises two sets of lugs 78a. Corresponding sections of lugs are also provided on the root of the wing tip device to interleave these lugs, such that apertures on the latching lugs are aligned to receive the locking pins 74 (see below).

In the embodiment of FIGS. 7 to 9, a primary locking mechanism comprises a first drive bar 82 provided for the first section of latching lugs 70, and a second drive bar 84 for the second section of latching lugs 76. On each drive bar 82, 84 two locking pins 74 extend from the drive bar such that they may be moved into and out of the apertures on the corresponding sets of lugs 72a, 78a to lock and unlock the lugs to those on the wing tip device (not shown). In this embodiment, the drive bars 82 and 84 move in a direction coaxial with the axis of the locking pins 74, but in opposing directions (i.e. the front locking bar 82 moves forwards, but the rear locking bar 84 moves rearwards).

The first drive bar 82 and second drive bar 84 may be connected to either individual or common actuators (not shown) to drive the movement of their respective locking pins 74 into and out of the locking positions. The skilled person will need no further explanation of this arrangement.

The drive bars 82, 84 each include protruding shoulders 88 and 90 respectively, on the side of the bar opposite to the locking pins. The shoulders 88 and 90 interact with a secondary locking mechanism. The secondary locking mechanism comprises blocking bar 86, provided with a first blocking portion 92, a second blocking portion 94, the second blocking portion 94 having a mushroom head, and a third blocking portion 96. The blocking bar 86 is connected to an actuator 98 via linkages 100, whereby the actuator may drive the blocking bar 86 in a generally spanwise direction (i.e. upwards and downwards local to the orientation of FIGS. 8 and 9).

FIG. 8 shows the blocking bar 86 in a position where no blocking of the drive bars 82, 84 takes place. FIG. 9 shows the blocking bar 86 where the actuator 98 has driven the blocking bar 86 outwards, with the drive bars 82 and 84 in the locked position (this is also the position shown in FIG. 7). The blocking portions 92, 94, 96 are then located proximate to the protruding shoulders 88, 90, such that the blocking portions 92, 94, 96 block the movement of the drive bars 82, 84, and hence block movement of the locking pins 74, from the locked position to the unlocked position.

Figure 10:
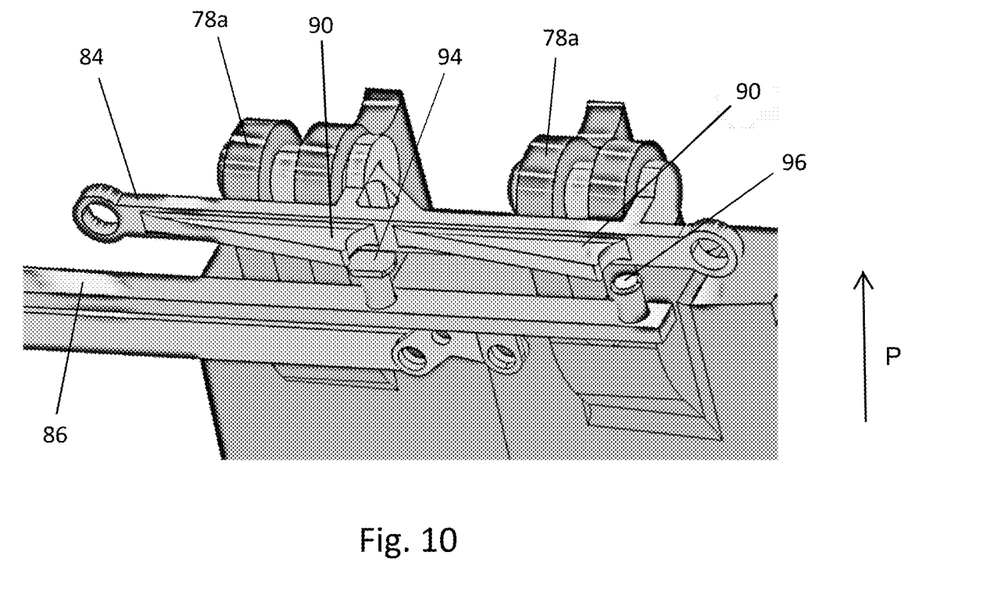
Figure 11:
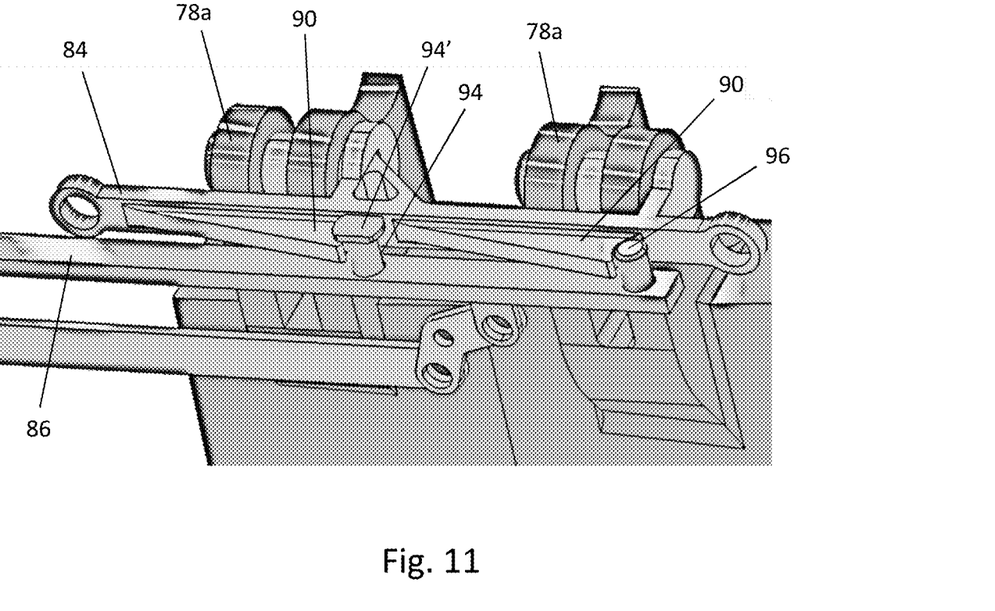

FIGS. 10 and 11 show the locked and not blocked position (FIG. 10), and locked and blocked position (FIG. 11) of the arrangement relating to the second drive bar 84 in greater detail. The locus of the movement of the blocking portion 94 (and the other blocking portion 96) is determined by the linkages. Those linkages and their respective pivot points are designed such that the mushroom head 94' of the protruding portion 94 passes out and back over the end of the shoulder 90. This enables the mushroom head to deadlock the blocking bar 86 in position because it prevents the secondary lock being moved away from its blocking position purely under a spanwise movement (i.e. it must first move slightly rearward (towards the right in FIG. 11) to unseat the mushroom head off the upper face of the blocking shoulder 84).

Whilst the present invention has been described and illustrated with reference to particular embodiments, it will be appreciated by those of ordinary skill in the art that the invention lends itself to many different variations not specifically illustrated herein. For example, other embodiments of secondary locking mechanism may be provided to block the movement of the locking pins in a different way. In principle, the blocking movement may be created by any interaction with the blocking member which prevents the removal of the locking pins.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising an aircraft wing, the aircraft wing comprising a fixed wing and a wing tip device at the tip of the fixed wing, wherein the wing tip device is configurable between:
  (i) a flight configuration for use during flight and
  (ii) a ground configuration for use during ground-based operations, in which ground configuration the wing tip device is moved away from the flight configuration such that a span of the aircraft wing is reduced,
  the aircraft wing further comprising a locking assembly for locking the wing tip device in the flight configuration, the locking assembly comprising a plurality of lugs located on each of the fixed wing and wing tip device, and locking pins which are inserted through, and lock together, corresponding lugs when the wing tip device is in the flight configuration, and further comprising a secondary locking mechanism having a plurality of blocking members which prevent the removal of the locking pins from the corresponding lugs, wherein the plurality of blocking members have a common actuator, and wherein the locking pins extend from a common drive bar and the blocking members are configured to abot the common drive bar in order to prevent removal of the locking pins.

2. The aircraft as claimed in claim 1, wherein the plurality of blocking members are mounted on a common drive axle, and movement of the blocking members into and out of the locking position is by rotation of the drive axle.

3. The aircraft as claimed in claim 1, wherein the plurality of blocking members are configured to abut the locking pins in order to prevent removal of the locking pins.

4. The aircraft as claimed in claim 1, wherein the plurality of blocking members are mounted the common drive bar, wherein the common drive bar forms part of a linkage, and movement of the blocking members into and out of the locking position is by actuation of the linkage.

5. The aircraft as claimed in claim 1, wherein at least one blocking member comprises a flared top section, the secondary locking mechanism is configured such that when said blocking member is blocking movement of a locking pin in a first direction, the flared top section is also blocking movement in a direction perpendicular the first direction.

6. An aircraft wing, the aircraft wing comprising a fixed wing and a wing tip device at the tip of the fixed wing, wherein the wing tip device is configurable between:
   (i) a flight configuration for use during flight and
   (ii) a ground configuration for use during ground-based operations, in which ground configuration the wing tip device is moved away from the flight configuration such that a span of the aircraft wing is reduced,
   the aircraft wing further comprising a locking assembly for locking the wing tip device in the flight configuration, the locking assembly comprising a plurality of lugs located on each of the fixed wing and wing tip device, and locking pins which are inserted through and lock together corresponding lugs when the wing tip device is in the flight configuration, and further comprising a secondary locking mechanism having a plurality of blocking members which prevent the removal of the locking pins from the corresponding lugs, wherein the plurality of blocking members have a common actuator, and wherein the locking pins extend from a common drive bar and the plurality of blocking members are configured to abut the common drive bar in order to prevent removal of the locking pins.

7. A method of locking a wing tip device on the aircraft as claimed in claim 1, wherein the method comprises the steps of:
   positioning the wing tip device in the flight configuration,
   actuating the locking pins such that the locking pins are inserted through, and lock together, corresponding lugs on the fixed wing and wing tip device, and
   actuating the blocking members such that the locking pins obstruct the movement of the locking pins out of the lugs.

8. A method of unlocking a wing tip device on the aircraft of claim 1, wherein the method comprises the steps of:
   actuating the plurality of blocking members such that the plurality of blocking members do not obstruct the movement of the locking pins out of the lugs, and
   actuating the locking pins such that they are withdrawn from the corresponding lugs, thereby allowing unrestricted movement of the lugs.

9. A locking assembly for an aircraft wing having a foldable wing tip that is hinged between
   (i) a flight configuration for use during flight and
   (ii) a ground configuration for use during ground-based operations, in which ground configuration the wing tip at the tip of a fixed wing is moved away from the flight configuration such that a span of the aircraft wing is reduced,
   wherein the locking assembly is for locking the foldable tip in the flight configuration, and comprises:
   a primary locking arrangement comprising a series of locking pins for insertion through aligned apertures between interleaving lugs on the tip of the fixed wing and root of the wing tip,
   wherein the locking pins extend from a common drive bar and the plurality of blocking members are configured to abut the common drive bar in order to prevent removal of the locking pins,
   and a secondary locking arrangement comprising a second plurality of blocking members which are actuated into a blocking position by a common actuator, to block the removal of the locking pins from the aligned apertures.

10. An aircraft comprising the locking assembly of claim 9.

* * * * *